(12) United States Patent
Sarkar et al.

(10) Patent No.: US 12,524,291 B2
(45) Date of Patent: Jan. 13, 2026

(54) AUTOMATED OPTIMIZATION OF ERROR-HANDLING FLOWS IN MEMORY DEVICES

(71) Applicant: MICRON TECHNOLOGY, INC., Boise, ID (US)

(72) Inventors: Jay Sarkar, San Jose, CA (US); Ipsita Ghosh, Kolkata (IN); Vamsi Pavan Rayaprolu, Santa Clara, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/631,928

(22) Filed: Apr. 10, 2024

(65) Prior Publication Data

US 2024/0256375 A1     Aug. 1, 2024

Related U.S. Application Data

(63) Continuation of application No. 17/897,910, filed on Aug. 29, 2022, now Pat. No. 11,994,936.

(51) Int. Cl.
  *G06F 11/07* (2006.01)
(52) U.S. Cl.
  CPC ...... *G06F 11/0784* (2013.01); *G06F 11/0757* (2013.01); *G06F 11/0787* (2013.01)

(58) Field of Classification Search
  CPC . G06F 11/0784; G06F 11/0757; G06F 11/078
  See application file for complete search history.

(56) References Cited

U.S. PATENT DOCUMENTS

| 2006/0212778 A1* | 9/2006 | Wheeler | G11C 29/52 714/764 |
| 2009/0125788 A1* | 5/2009 | Wheeler | G06F 11/106 714/764 |
| 2019/0278653 A1* | 9/2019 | Padilla, Jr. | G06F 11/0793 |
| 2021/0304837 A1 | 9/2021 | Kim | |
| 2023/0110012 A1 | 4/2023 | Jasleen et al. | |

\* cited by examiner

*Primary Examiner* — Thien Nguyen
(74) *Attorney, Agent, or Firm* — LOWENSTEIN SANDLER LLP

(57) ABSTRACT

Systems and methods are disclosed including a memory device and a processing device operatively coupled to the memory device. The processing device can perform operations including selecting sample data residing in the memory device; running a test on the sample data regarding a set of error-handling operations; and generating log data comprising a first order of the set of error-handling operations to be performed on data residing in a segment of the memory device.

17 Claims, 9 Drawing Sheets

ERROR-HANDLING LOG TABLE 410

| Iteration | Pass number of EH Operation 1 | Pass number of EH Operation 2 | Pass number of EH Operation 3 | Pass number of EH Operation 4 | Pass number of EH Operation 5 | Pass number of EH Operation 6 | Selected EH Operation | Reminder number |
|---|---|---|---|---|---|---|---|---|
| 1 | A1 | A2 | A3 | A4 | A5 | A6 | Operation 2 | R1 |
| 2 | B1 | N/A | B3 | B4 | B5 | B6 | Operation 1 | R2 |
| 3 | ⋮ | ⋮ | ⋮ | ⋮ | ⋮ | ⋮ | Operation 4 | R3 |
| 4 | ⋮ | ⋮ | ⋮ | ⋮ | ⋮ | ⋮ | Operation 6 | R4 |
| 5 | F1 | F2 | F3 | F4 | F5 | F6 | Operation 5 | R5 |
| 6 | ⋮ | ⋮ | ⋮ | ⋮ | ⋮ | ⋮ | Operation 3 | R6 |
| ⋮ | | | | | | | ⋮ | ⋮ |

FIG. 4

| First Optimal Rank | Step ID | Operation Parameter | Step Latency | Probability of Execution | Sum Cost | Second Optimal Rank |
|---|---|---|---|---|---|---|
| \multicolumn{7}{|c|}{ERROR-HANDLING FLOW TABLE 510} | | | | | | |
| 2 | S1 | OP1 | L1 | P1 | C1 | 2 |
| 1 | S2 | OP2 | L2 | P2 | | 3 |
| 6 | S3 | OP3 | ... | ... | | ... |
| 3 | S4 | OP4 | ... | ... | | ... |
| 5 | S5 | OP5 | ... | ... | | 1 |
| 4 | S6 | OP6 | L6 | P6 | | ... |
| ... | ... | ... | ... | ... | ... | ... |

FIG. 5

AUTOMATED OPTIMIZATION OF ERROR-HANDLING FLOWS IN MEMORY DEVICES

RELATED APPLICATIONS

The present application is a continuation of U.S. patent application Ser. No. 17/897,910, filed Aug. 29, 2022, the entire contents of which are hereby incorporated by reference herein.

TECHNICAL FIELD

Embodiments of the disclosure relate generally to memory sub-systems, and more specifically, relate to automated optimization of error-handling flows in memory devices.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

FIGS. 4-5 illustrate example error-handling flow data in accordance with aspects of the present disclosure.

DETAILED DESCRIPTION

Figure 1:
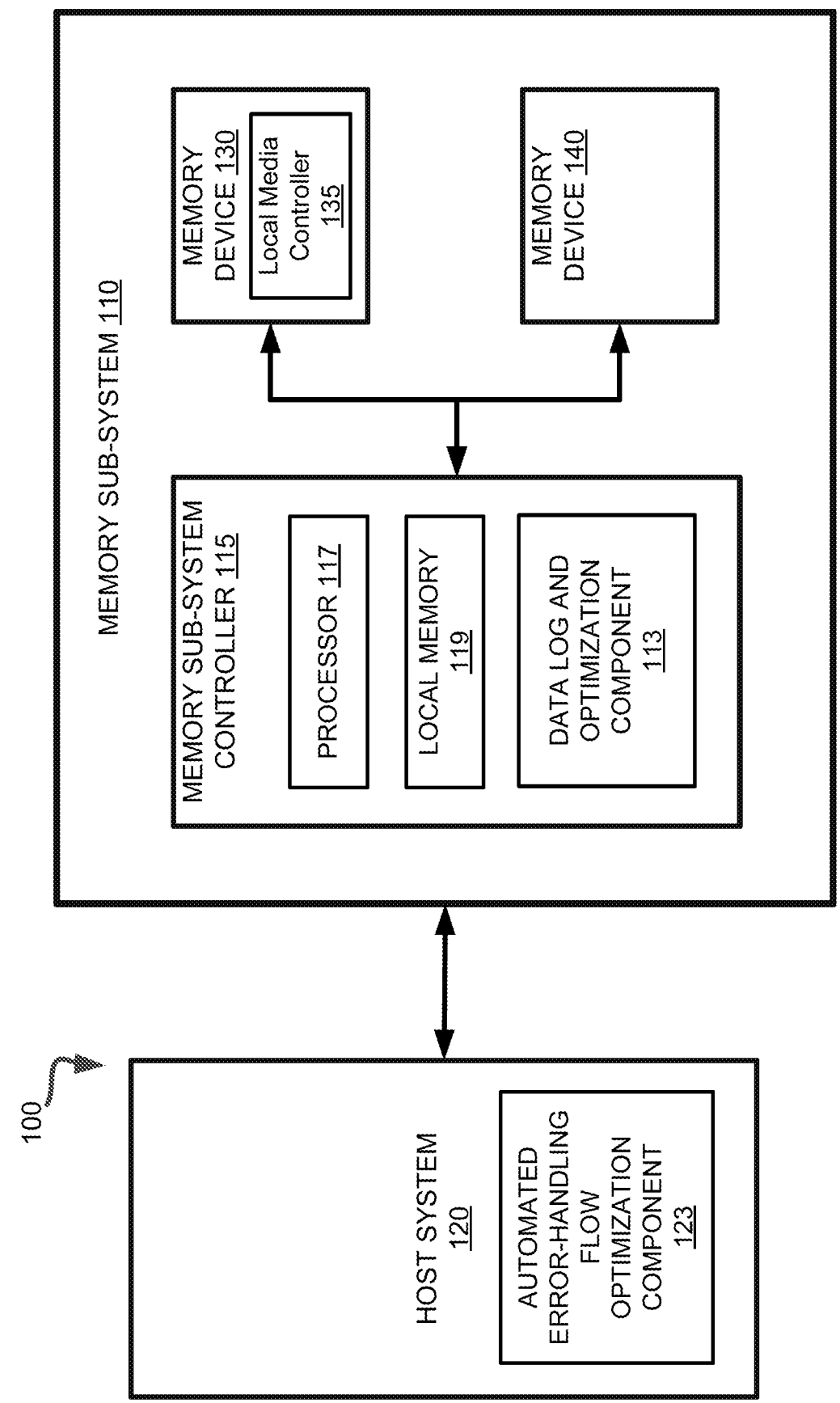
FIG. 1 illustrates an example computing system that includes a memory sub-system in accordance with some embodiments of the present disclosure.

Aspects of the present disclosure are directed to managing error-handling flows in memory devices. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can utilize one or more memory devices, including any combination of the different types of non-volatile memory devices and/or volatile memory devices, to store the data provided by the host system. One example of a non-volatile memory device is a not-and (NAND) memory device. Other examples of non-volatile memory devices are described below in conjunction with FIG. 1. Each of the memory devices can include one or more arrays of memory cells. A memory cell ("cell") is an electronic circuit that stores information. Depending on the cell type, a cell can store one or more bits of binary information, and has various logic states that correlate to the number of bits being stored. The logic states can be represented by binary values, such as "0" and "1", or combinations of such values.

Various data operations can be performed by the memory sub-system. The data operations can be host-initiated operations. For example, the host system can initiate a data operation (e.g., write, read, erase, etc.) on a memory sub-system. The host system can send access requests (e.g., write command, read command) to the memory sub-system, such as to store data on a memory device at the memory sub-system and to read data from the memory device on the memory sub-system. The data to be read or written, as specified by a host request, is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. Metadata can also include error-handling data (e.g., error correction code (ECC) codeword parity data), data version (e.g. used to distinguish age of data written), valid bitmap (which LBAs or logical transfer units contain valid data), etc.

A memory device includes multiple memory cells capable of storing, depending on the memory cell type, one or more bits of information. A memory cell can be programmed (written to) by applying a certain voltage to the memory cell, which results in an electric charge being held by the memory cell, which is called the "threshold voltage" and denoted as Vt. A memory device can have distributions that are narrow compared with the working range of control voltages tolerated by the cells of the device. Accordingly, multiple distributions (with "valleys" between distributions) can be fit into the working voltage window allowing storing and reliably detecting multiple bits per cell such as $2^3=8$ distributions (7 valleys) for TLC, $2^2=4$ distributions (3 valleys) for MLC etc. The distributions are interspersed with voltage intervals ("valley margins") between distributions where none (or very few) of the memory cells of the device have their threshold voltages. Therefore, such valley margins can be used to separate various charge states—the logical state of the cell can be determined by detecting, during a read operation by applying read voltages corresponding to each valley. This effectively allows a single memory cell to store multiple bits of information: a memory cell operated with $2^N$ distributions (which are also called levels) is capable of storing N bits of information. During the read operation, $2^N-1$ read voltages are applied to distinguish $2^N$ distributions. Specifically, the read operation can be performed by comparing the measured threshold voltage $V_T$ exhibited by the memory cell to one or more reference voltage levels corresponding to known valleys (e.g., centers of the valleys) of the memory device.

Due to the phenomenon known as slow charge loss (SCL), the threshold voltage $V_T$ of a memory cell can change with time as the electric charge of the cell is diminishing, the process sometimes referred to as "temporal voltage shift" (TVS). Since typical cells store negatively charged particles (electrons), the loss of electrons causes the voltage thresholds to shift along the voltage axis towards lower voltage thresholds $V_T$. The threshold voltages can change rapidly at first (immediately after the memory cell is programmed) while slowing down at larger times in an approximately log-linear or power-law fashion ($\Delta V_T(t) = -C*t^b$) with respect to the time t elapsed since the cell programming event. TVS can be mitigated by keeping track of the time elapsed since the programming event as well as of the environmental conditions of a particular memory partition (block, plane, etc.) such as temperature and associating a voltage offset $\Delta V_T$ per valley to be used during read operations, where the standard "base read level" threshold voltage $V_T$ (displayed by the cell immediately after programing) is modified by the voltage offset: $V_T \rightarrow V_T + \Delta V_T$ where $\Delta V_T$ is negative due to charge loss.

"Read error" refers to a memory sub-system's failure to validate one or more data items that have been retrieved from a memory device in response to a read command. Read errors can be associated with host-initiated read operations or system-initiated scanning operations and can occur due to, for example, the measured threshold voltage $V_T$ exhibited by the memory cell mismatching the read voltage levels due to TVS, the requested data being subjected to noise or interference, etc. In a read error, the number of bit errors in the read data is greater than what the underlying ECC can correct and this results in an ECC failure. In response to a read error, the memory sub-system can perform an error-handling flow in an attempt to recover the data. The error-handling flow can include one or more error-handling operations performed with respect to the data items that have been retrieved from the memory device. An error handling operation, for example, can include one or more read retries using different parameters, such as a change in read voltage, as compared to the initial read operation performed on the memory cell. The error-handling operation can also include "deep error handling techniques," such as forward error correction (FEC) with various versions of reliability information, hybrid automatic repeat request (HARQ), etc.

In conventional systems, the memory sub-system controller uses a default (e.g., static) error-handling flow, in which the order of the error-handling operations performed during an error-handling flow remains the same for all blocks of the memory device over the entire life of the memory sub-system. For example, the order of the error-handling operations may be initially set based on characterization data collected during product development, but remains static even as the actual operating conditions change. Certain changes in operating conditions may result in inefficiencies in the predefined order of error-handling operations, such as increased latency. The inefficiencies cannot be addressed, however, due to the static order of the error handling operations. In some implementations, in response to sudden systematic changes to the memory sub-system, such as a sudden change in operating temperature (e.g., operating temperature rises 20° C. over a period of a few seconds), the memory sub-system controller can adjust the order of the error-handling operations performed during an error-handling flow by performing the last successful error handling-operation of an error-handling flow as the first error-handling operation in response to a new read error. These error-handling techniques, however, fail to consider both the latency measurements at a host or global level and aggregated latency information at a statistical level, which can result in time-consuming operations and impact performance of the memory sub-system, and increased read times and degraded performance as observed by the host system. In addition, these error-handling techniques do not consider the system latency and throughput under varied workload stress conditions. In some implementations, the memory sub-system controller can collect data of an aggregate count of the error-handling operation that has been successfully performed with respect to the data items that have been retrieved from the memory device. However, the error-handling data collection only illustrates how effective the current error-handling flow is, but does not offer an option for optimizing the error-handling flow.

Aspects of the present disclosure improve the efficiency of error-handling operations by implementing a system capable of automatically adjusting the order of error-handling operations in error-handling flows in memory devices. Data especially designed for automation is collected at the memory device level. In addition, data of operations at the production environment with respect to workload including specific running applications for a specific customer can be considered for optimizing the error-handling flows for a memory device or a batch of memory devices that are being used by the specific customer. The optimization can be performed automated to adjust the error-handling flows through the special design of the log data collected at the memory device and the automated communication between the memory devices and the data center using various data science methods including machine-learning models.

In some implementations, log data is acquired at certain pre-defined intervals from memory devices (e.g., SSD populations) that are specially designed for automated optimization. The error-handling flow may be first optimized at the memory device level (e.g., as a first optimal order) and log data including such information may be generated and supplied to data center for additional error-handling flow optimization. In addition, such memory devices used by the customer may experience a specific pattern for workload, and the error-handling information related to the memory devices associated with the customer may be used to improve the future error-handling related to the memory devices associated with the customer. As such, a model, such as a Bayesian Optimization model, can be used to optimize the error-handling related to the memory devices associated with the initial optimal order and the order necessitated by production workload experienced at the customer environment. For example, latency and probability of error recovery involved in the error-handling flow can be used to optimize the error-handling flow, e.g., re-order the error-handling operations in the error-handling flow. As such, the automation of the error-handling flow optimization may be obtained by a background task performed at the memory device and a communication performed between the memory device and the host system. Therefore, a re-ordered error-handling flow is provided with the automated consideration of latency-cost of each recovery step for specific drive population and their experienced workloads. Thereafter, the SSD population can be updated with the re-ordered error-handling flow, which provides the best population latency customized to a specifically experienced workload.

Advantages of the present disclosure include an improved performance of the memory sub-system by automating the optimization of error-handling flow without necessary human intervention. The optimization is automatically customized to specific workloads, and thus decreases the latency of error-handling flows performed by the memory sub-system. This can result in an improvement of performance of the memory sub-system and a decrease in power consumption by the memory sub-system. Furthermore, this can increase the lifespan of the memory sub-system. Although embodiments are described using memory cells of a NAND flash memory, aspects of the present disclosure can be applied to other types of memory sub-systems.

FIG. 1 illustrates an example computing system 100 that includes a memory sub-system 110 in accordance with some embodiments of the present disclosure. The memory subsystem 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type flash memory (e.g. 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical MU address, physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which includes a raw memory device 130 having control logic (e.g., local controller 132) on the die and a controller (e.g., memory sub-system controller 115) for media management within the same memory device package. An example of a managed memory device is a managed NAND (MNAND) device.

The memory sub-system 110 includes a data log and optimization component 113 that can provide log data for use in the error-handling flow optimization. The data log and optimization component 113 may monitor the error-handling operations. The data log and optimization component 113 may maintain log data including a first optimal order of the set of error-handling operations to be performed on data residing in a segment of the memory device. That is, the data log and optimization component 113 may optimize the original order of the set of error-handling operations to obtain the first optimal order. The log data may include additional information that is required by the device providing additional error-handling flow optimization. The data log and optimization component 113 may send the log data to the host system 120 for the additional error-handling flow optimization.

The host system 120 includes an automated error-handling flow optimization component 123 that can be used to implement the error handling strategies in accordance with embodiments of the present disclosure. In some embodiments, the memory sub-system 110 includes at least a portion of the automated error-handling flow optimization component 123. For example, the memory sub-system controller 115 can include a processor 117 (processing device) configured to execute instructions stored in local memory 119 for performing the operations described herein. In some embodiments, the automated error-handling flow optimization component 123 is part of an application, or an operating system. The automated error-handling flow optimization component 123 can optimize the error-handling operations associated with the memory device 130, as described in more detail herein below.

The automated error-handling flow optimization component 123 may monitor the error-handling recovery for a memory device (or a subset of the memory device) for a specific user device that has a workload using the memory device. The automated error-handling flow optimization component 123 may acquire the monitored data as log data at certain pre-defined intervals or upon a change or update that triggers the acquisition (e.g., execution of a re-ordered error-handling flow).

The automated error-handling flow optimization component 123 may generate, build, contrast, or train a machine-learning model using the log data. In some implementations, the error-handling recovery log data may be associated with a specific memory device that is used by a specific user device performing a specific workload. In some implementations, the log data may be associated with a similar population of the memory devices that are used by similar user devices performing similar workloads. With sufficient log data, the machine-learning model can be a global model that is applicable to various populations of various memory devices with various workloads. For example, the workload can be read heavy, write heavy, retention centric, disruption centric, etc. The granularity of memory devices can be a die, a whole drive, or multiple drives.

The automated error-handling flow optimization component 123 may apply the machine-learning model to the log data to obtain a reordered rank (i.e., order) of the error-handling operations in the error-handling flow. The automated error-handling flow optimization component 123 may send the reordered rank to the corresponding memory device to perform the error-handling operations in the adjusted order for the error-handling flow. The automated error-handling flow optimization component 123 may further use data of the operations in the reordered rank to update the error-handling recovery log data for training the machine-learning model.

Figure 2:
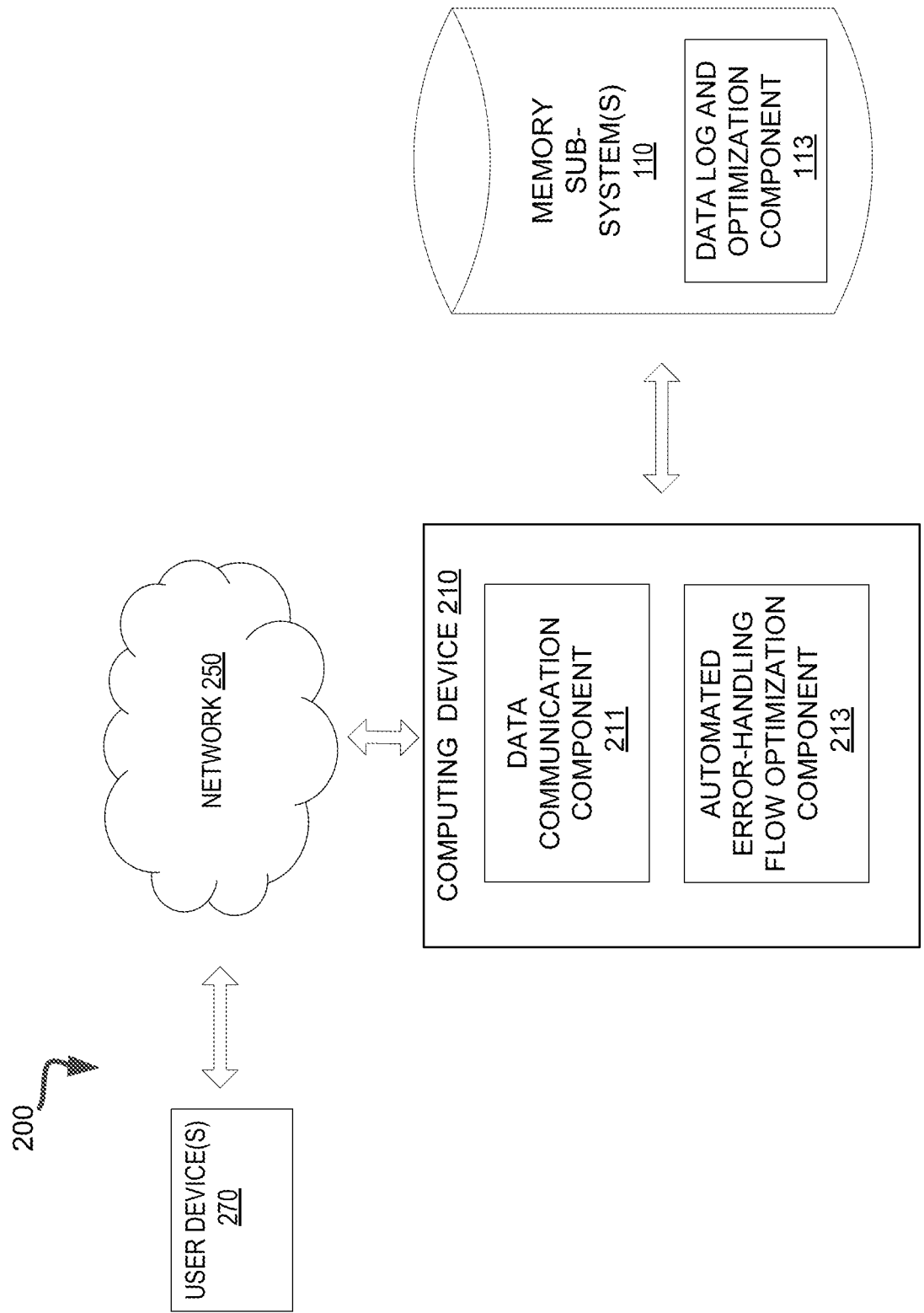
FIGS. 2-3 illustrate example system architectures that include user devices using memory sub-systems in accordance with some embodiments of the present disclosure

FIG. 2 illustrates an example system architecture 200 that includes user devices 270 using memory sub-systems 110 in accordance with some embodiments of the present disclosure. System architecture 200 includes memory sub-systems 110, a computing device 210, user devices 270, and a network 250. Network 250 may be a public network (e.g., the Internet), a private network (e.g., a local area network (LAN) or wide area network (WAN)), or a combination thereof.

The user device 270 may be a desktop computer, a laptop computer, a smartphone, a tablet computer, a server, or any suitable computing device capable of providing users different services through different user interfaces, including applications, websites. In some implementations, the user device 270 provides an application that allows the user to have an option to provide latency data for specific workload with a unit of a memory device (e.g., a die, a whole SSD, or a SSD population) and an option to optimize the error-handling flow when using the unit of a memory device.

The memory sub-system 110 may perform a background task for error-handling flow optimization. The memory sub-system 110 may generate log data that is specially designed to feed into the computing device 210 for an automated optimization of error-handling flow. In one implementation, the memory sub-system 110 includes a data log and optimization component 113, as described with respect to FIG. 1. The data log and optimization component 113 may generate log data by various methods, including the method 700. The data log and optimization component 113 may communicate with the computing device 210 regarding the log data. In some implementations, the communication between the data log and optimization component 113 and the computing device 210 may be enabled or un-enabled, for example, by vendor-unique commands or a new NVMe like command. In some implementations, the data log and optimization component 113 may send the log data to the computing device (e.g. through the data communication component 211) at a preset interval. In some implementations, the data log and optimization component 113 may send the log data to the computing device (e.g. through the data communication component 211) upon a new data set (e.g., the error-handling log table 410) is generated.

The computing device 210 may perform error-handling flow optimization using artificial intelligence to effectively optimize the error-handling flow for a specific customer environment including workload, hardware, and environment for a memory device or multiple memory devices. The artificial intelligence may be in the form of a trained machine learning model. In one embodiment, computing device 110 may be a desktop computer, a laptop computer, a smartphone, a tablet computer, a server, or any suitable computing device capable of performing the techniques described herein. The computing device 310 may be a cloud service server.

In one implementation, the computing device 210 may include data communication component 211 and automated error-handling flow optimization component 213. The data communication component 211 may receive data from user devices 270, such as latency data for each of the error-handling operations that have been performed on the data residing in the segment of the memory device. The data communication component 211 may receive data from memory sub-systems 110 (e.g., through the data log and optimization component 113), such as log data including a first optimal order of a set of error-handling operations to be performed on data residing in the segment of the memory device. In some implementations, the latency data that are specific to a user device using a memory sub-system may be sent from the specific user device 270 to the specific memory sub-system 110 and saved as part of log data, as the example shown in FIG. 5. The data communication component 211 may receive data described above constantly, for example, at certain intervals and save it as log data, which may be used for automation of error-handling flow optimization.

The automated error-handling flow optimization component 213 may include a model (e.g., a Bayesian Optimization model) that effectively represents optimized error-handling steps with latency impacted by workload experiences and memory device variations and achieves a minimum system latency for a given workload on a given memory device, as illustrated with respect to FIG. 5. The model can also include a model of stochastic optimization, Markov Chain Monte Carlo, Reinforcement Learning, Combinatorial Optimization, Mixed Linear Programming Optimization, or combination thereof.

The automated error-handling flow optimization component 213 may include a training engine to train one or more machine learning models and save the trained models as models. The set of machine learning models may refer to model artifacts that are created by the training engine using the training data that includes training inputs and corresponding target outputs (correct answers for respective training inputs). In some embodiments, the machine learning model may be an optimization model as described below in detail. The automated error-handling flow optimization component 213 may apply the one or more machine learning models to perform reordering of the error-handling flow and obtain a reorder of the set of the error-handling operations (e.g., the second optimal order).

Although some specifications are illustrated above, it should be understood that the number and type of models that are used and the arrangement of such models can be modified to achieve the same or similar end results according to the aspects of the present disclosure. In some embodiments, one or more models are used to perform one or more of the optimization tasks, for example, optimization for different workloads and/or different memory devices. Each task may be performed by a separate model. Alternatively, a single model may perform each of the tasks or a subset of the tasks. Additionally, or alternatively, different models may be used to perform different combinations of the tasks.

The automated error-handling flow optimization component 213 may send the second optimal order of the set of error-handling operations to memory sub-systems 110 for implementation. Accordingly, the memory sub-systems 110 may perform the one or more error-handling operations of the set of error-handling operations in the second optimal order to the data residing in the segment of the memory device.

Figure 3:
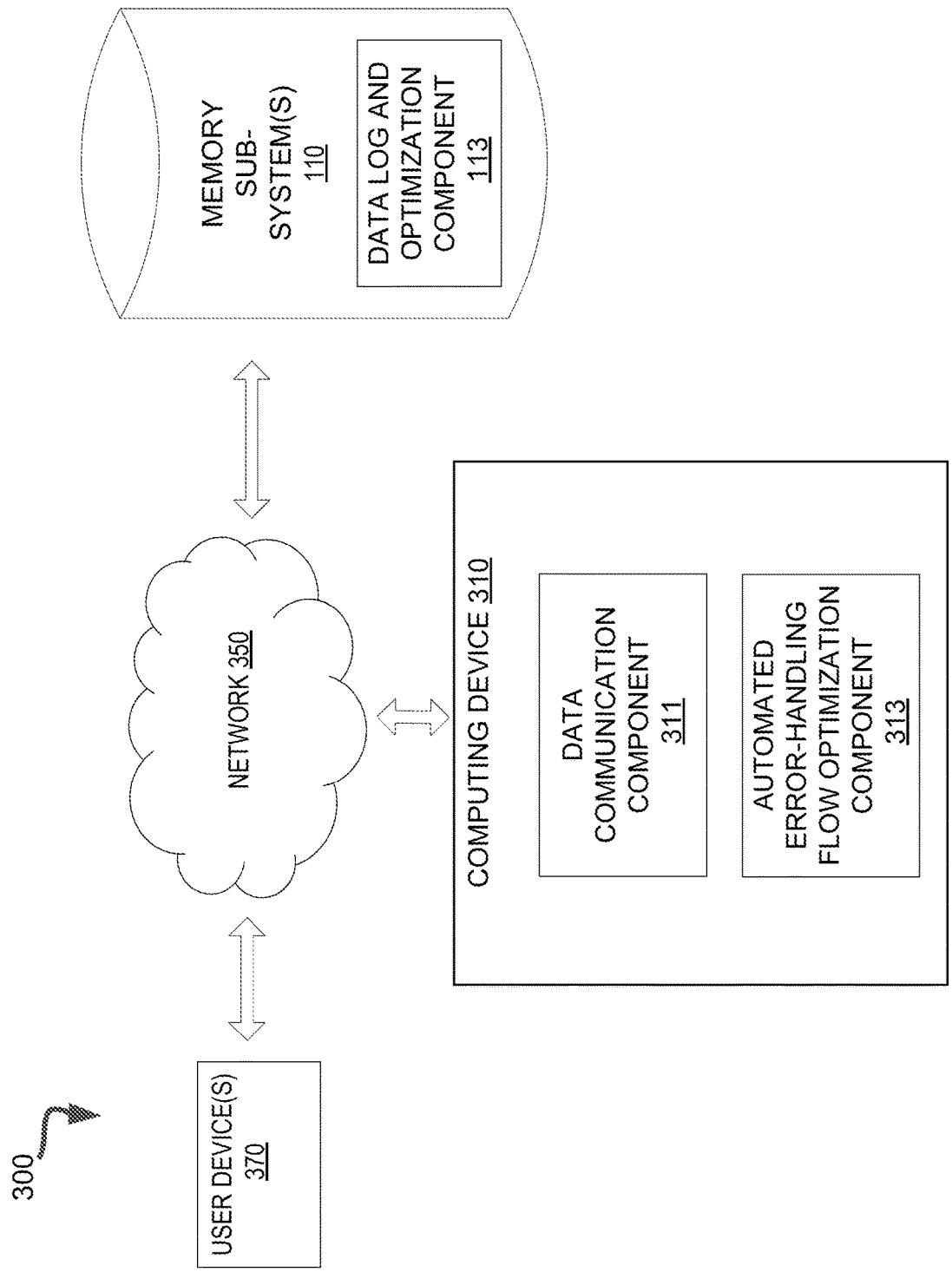

FIG. 3 illustrates an example system architecture 300 that includes user devices 370 using memory sub-systems 110, in accordance with some embodiments of the present disclosure. System architecture 300 includes memory sub-systems 110, a computing device 310, user devices 370, and a network 350. The user devices 370, the network 350, the memory sub-systems 110 may be same as or similar to the user devices 270, the network 250, the memory sub-systems 110 described above. The computing device 310 may include data communication component 311 and automated error-handling flow optimization component 313, which may be same as or similar to the data communication component 211 and automated error-handling flow optimization component 213 described above. It is noted that although specific system architectures are shown in FIGS. 2-3, any or part of component or device in the system can be incorporated into other part of the system, separated into smaller components, or combined together, and the arrangement and number of the components and devices in the system and the communication among the components and devices can be modified as long as the end results according to the present disclosure are achieved.

FIG. 4 schematically illustrates example error-handling log data 400 in accordance with aspects of the present disclosure. The error-handling log data 400 may be saved in a persistent storage that is capable of storing the error-handling log data 400 (e.g., tables) as well as data structures to tag, organize, and index the error-handling log data 400 (e.g., tables). Such persistent storage may be hosted by one or more storage devices, such as main memory, magnetic or optical storage based disks, tapes or hard drives, NAS, SAN, and so forth. In some implementations, the error-handling flow data 500 may be saved in a network-attached file server, while in other embodiments, the error-handling flow data 400 may be saved in other type of persistent storage such as an object-oriented database, a relational database, and so forth, that may be hosted by a server machine or one or more different machines coupled to the via a network.

Generating the error-handling log data 400 may be a background task of a host system or a memory device. In some implementations, the background task may be enabled by a firmware module. In some implementations, the error-handling log data 400 may be generated by a controller of the memory device (e.g., memory sub-system controller 115 or local media controller 135). In some implementations, the error-handling log data 400 may be generated by a controller of the host system.

The error-handling log data 400 may be generated at a time interval. The error-handling log data 400 may be generated by testing sample data that is applicable to a workload and a memory element. The workload may refer to a specific workload, a specific type of workload, or a group of similar workload. The memory element may refer to a specific unit of memory device including blocks, pages, etc., a specific type of memory device, or a group of similar memory devices. The sample data may be tested on a set of error-handling operations. In one implementation, the sample data may be tested on all available error-handling operations. In some implementations, the available error-handling operations may depend on the workload and/or the memory element.

As shown in the example of FIG. 4, the processing logic may collect "X" codewords as sample data and the error-handling operations for testing may include operations 1-6. In the iteration 1, all "X" codewords are passed through each of six error-handling operations, and the pass number, i.e., the number of codewords that has been successfully recovered by the respective error-handling operation, of each error-handling operation is recorded. The operation that has the highest pass number is selected as the first place of an order of six error-handling operations. Alternatively, if two or more operations that have the same highest pass number, the one with lowed latency is selected. Although the latency data is not shown in FIG. 4, it should be understood that the latency data is collected along with passing the codeword to the respective error-handling operation. For example, in FIG. 4, A2 is the largest compared to A1, A3, A4, A5, A6, and thus, operation 2 is selected through iteration 1. So, after "X" codewords passing operation 2, the reminder number of codewords R1 is equal to X−A2. In the iteration 2, the remaining R1 codewords are passed through the unselected operations, i.e., operations 1 and 3-6, and the pass number of each operation is recorded. For example, in FIGS. 4, B1 and B4 are the same largest compared to B3, B5, B6, and operation 1 offers less latency than operation 4, and thus, operation 1 is selected through iteration 2 as the second place of an order of six error-handling operations. So, after "X" codewords passing operation 2 and operation 1, the reminder number of codewords R2 is equal to X−A2−B1. The process continues with iterations 3, 4, . . . , N until all operations have been selected, in the example of FIG. 4, six iterations are performed. Alternatively or additionally, the process continues with iterations 3, 4, . . . N, until the reminder number of codewords after the last iteration is zero or below a present threshold value. As such, an order of the error-handling operations are obtained in a way such that codewords unprocessed from the most efficient error-handling operation in a given iteration (i.e. error-handling operation that has most passes and least failures) are channeled into the next iteration for subsequent evaluations. The selected operations form an order of the error-handling flow (e.g., operations 2, 1, 4, 6, 5, 3), which may be an example of a first optimal order of a set of the error-handling operations.

As illustrated above, the error-handling log table 410 is collected based on sample data, for example, specific to several blocks of a memory device and related to a workload that can be associated with several error-handling operations. For different memory elements and/or different workloads, the data collected are different. As such, multiple data, for example, multiple error-handling log table 410, related to multiple samples of a memory device and/or related to multiple different workloads may be collected. All or portion of data collected may be sent to a device providing additional error-handling flow optimization (e.g., the automated error-handling flow optimization component 123 of FIG. 1, the automated error-handling flow optimization component 213 of FIG. 2, or the automated error-handling flow optimization component 313 of FIG. 3).

FIG. 5 schematically illustrates example error-handling flow data 500 in accordance with aspects of the present disclosure. The error-handling flow data 500 may be saved in a persistent storage that is capable of storing the error-handling flow data 500 (e.g., tables) as well as data structures to tag, organize, and index the error-handling flow data 500 (e.g., tables). Such persistent storage may be hosted by one or more storage devices, such as main memory, magnetic or optical storage based disks, tapes or hard drives, NAS, SAN, and so forth. In some implementations, the error-handling flow data 500 may be saved in a network-attached file server, while in other embodiments, the error-handling flow data 500 may be saved in other type of persistent storage such as an object-oriented database, a relational database, and so forth, that may be hosted by a server machine or one or more different machines coupled to the via a network.

In some embodiments, automated error-handling flow optimization component 123 can maintain an error-handling flow table 510. In some embodiments, error-handling meta-data table 510 can be stored in memory of the memory sub-system (e.g., at memory device 130, 140, local memory 119, etc.) and can be referenced by automated error-handling flow optimization component 123 to determine a reordered-optimal error-handling flow (e.g., second optimal rank).

As illustrated by error-handling flow table 510, each error-handling flow can be associated with a particular set of error-handling operations to be performed in a particular order (e.g., order of operations). The particular order may include an initial-optimal rank (e.g., first optimal rank) and a reordered-optimal rank (e.g., second optimal rank). Each error-handling operation can be associated with parameters, such as step ID, operation parameters (such as an indication of workload, or an identification of memory device), step latency, probability of execution, and sum cost. The step ID may represent an error-handling operation. The operation parameters may include an indication of a specific workload and an identification of a specific memory device or a specific part of a memory device. The step latency may be represented or calculated as a sum of latency including current and previous steps of the error-handling operation. The probability of execution may represent the likelihood that the data will be successfully recovered for the respective error-handling operation and may be calculated as a ratio of the count of successful performance (i.e., successful recovery of the data) overall count of performance for the error-handling operation. In one implementation, the probability of execution may be obtained from the error-handling data table 410 by using the pass numbers thereof. The sum cost may be represented or calculated as an overall latency indication based on domain knowledge of memory device design as well as workload experience using different methodologies. In one implementation, the sum cost may be calculated as a sum of the aggregated latency of each operation (including all latency of previous operations in the error-handling flow) times the probability of execution of the respective operation (e.g., $C1=L1 \times P1+L2 \times P2+ \ldots +L6 \times P6$). The error-handling flow table 510 only shows one set of data for the sum cost per the first optimal rank, however, multiple sets of data may be maintained for the sum cost per the initial-optimal rank, and a suitable statistical measurement, such as mean, median, or mode, of the sum cost per the initial-optimal rank can be used to find a reordered-optimal rank (e.g., second optimal rank). As such, the optimization engine/component may use the above information in the error-handling flow table 510 to create a model that effectively represents optimized error-handling steps with latency impacted by workload experiences and memory device variations and achieves a minimum system latency for a given workload on a given memory device.

For example, the model may be a Bayesian Optimization model. Bayesian Optimization is the Sequential Model-Based Optimization (SMBO) algorithm that can be used in applications where an evaluation of the fitness function is expensive. The algorithm may involve optimizing the acquisition function, evaluating the selected sample with the objective function, and updating the surrogate function based on the evaluation. The acquisition function may refer to a technique by which the posterior is used to select the next sample from the search space (e.g., orders of steps). The objective function may refer to a function between the sum cost and the ranked order of the set of the error-handling operations. The surrogate function may refer to the approximation of the objective function that can be efficiently sampled. In one implementation, the Bayesian Optimization is a discrete Bayesian Optimization because of the discrete order of steps. The process is repeated until the objective function is approximated well by the surrogate function and the estimate of the optimal order is achieved through the sampled points. The model can output a reordered-optimal rank (e.g., second optimal rank) as shown in FIG. 5. It is noted that Bayesian Optimization is illustrated as an example, alternative or additional optimization methods can include stochastic optimization, Markov Chain Monte Carlo, Reinforcement Learning, Combinatorial Optimization, and/or Mixed Linear Programming Optimization.

Figure 6:
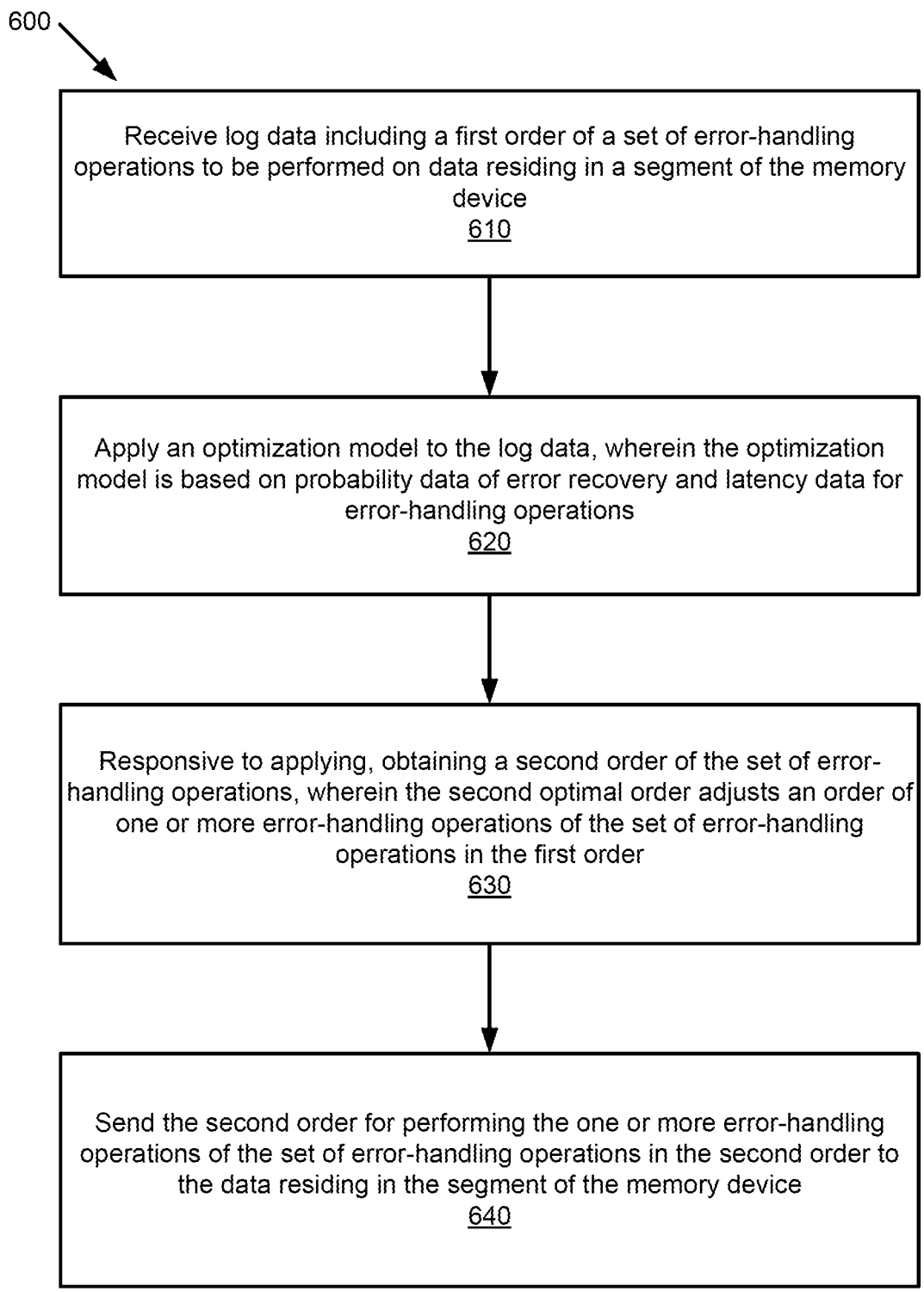
FIGS. 6-8 are flow diagrams of example methods of performing error-handling flow optimization in accordance with some embodiments of the present disclosure.

FIG. 6 is a flow diagram of an example method 600 of error-handling flow optimization in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the automated error-handling flow optimization component 123 of FIG. 1, the automated error-handling flow optimization component 213 of FIG. 2, or the automated error-handling flow optimization component 313 of FIG. 3. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

At operation 610, the processing logic receives log data including a first optimal order of a set of error-handling operations to be performed on data residing in a segment of the memory device. The log data may include information that is required for optimization of error-handling flow. In one implementation, the log data may include probability data of error recovery and latency data of a set of error-handling operations. The probability data of error recovery may refer to a ratio of the number of data successfully recovered (i.e., passing) by the error-handling operation to the total number of data handled (i.e., including passing and failure) by the error-handling operation. The latency data may refer to the time delay after detecting an error to finish performing the error-handling operation.

The log data may include error recovery log data at certain pre-defined intervals and error recovery log data upon a change/update is detected for data recovery performance. Some or all of the error recovery log data may be received from a memory device (e.g., SSD) or a segment of the memory device (e.g., a die of SSD) or multiple memory devices (e.g., SSD population). Some of the error recovery log data may be received from a device that is accessible by a user and saves it as user data. In some implementations, the log data may include latency data for each of the error-handling operations regarding a workload specified to a user environment, and the latency data may be received from a user device that performs the workload.

The first optimal order of the set of error-handling operations may be a result of an initial effort to place the error-handling operations in order and/or an optimization performed within the memory sub-system. It is noted that the first optimal order is not necessarily a result of an optimization performed within the memory sub-system, and the first optimal order can be a result of an initial operation of placing a set of the error-handling operations in order by the memory sub-system. The term "first optimal order" refers to an initial order that is optimal compared to an order of a set of the error-handling operations placed in a traditional way. For example, the operations, performed within the memory sub-system, regarding the initial order may be configured as a background task, which is described in detail with respect to FIGS. 4 and 7.

At operation 620, the processing logic applies an optimization model to the log data, wherein the optimization model is based on probability data of error recovery (e.g., probability of execution in error-handling flow table 510) and latency data (e.g., step latency in error-handling flow table 510) for error-handling operations.

In some implementations, the processing logic may apply the optimization model to the log data at a preset interval. In some implementations, the processing logic may apply the optimization model to the log data upon receiving a request for optimization of error-handling flow for a segment of the memory device with respect to a workload specified to a user environment. For example, in some implementations, an application running at the user device may detect a workload change and send a request for optimization of error-handling flow. In some implementations, an application running at the user device may detect an environment change (e.g., temperature change) and send a request for optimization of error-handling flow. In some implementations, an application running at the user device may detect a hardware change (e.g., a new memory device is used) and send a request for optimization of error-handling flow. In some implementations, a criterion for sending a request for optimization may be presented by a user. For example, the user may set the criterion so that the optimization request is sent every certain interval.

At operation 630, the processing logic obtains a second optimal order of the set of error-handling operations as a result of applying the optimization model, wherein the second optimal order adjusts an order of one or more error-handling operations of the set of error-handling operations in the first optimal order. For example, the processing logic may update the error-handling flow data (e.g. metadata) by replacing previous error-handling operation order with the current error-handling operation order. As another example, the processing logic may update the error-handling flow data (e.g. table) by adding the reordered error-handling operation order in addition to the initial error-handling operation order as illustrated with respect to FIG. 5. As such, a real-time error-handling flow has been optimized for a segment of the memory device with respect to a workload specified to a user environment, and the optimization is based on latency data collected at a statistical level and is customized to the specific user's or set of users' workload.

At operation 640, the processing logic may send the second optimal order, to the memory device, or a sub-system controller of the memory device, for performing the one or more error-handling operations of the set of error-handling operations in the second optimal order on the data residing in the segment of the memory device.

Figure 7:
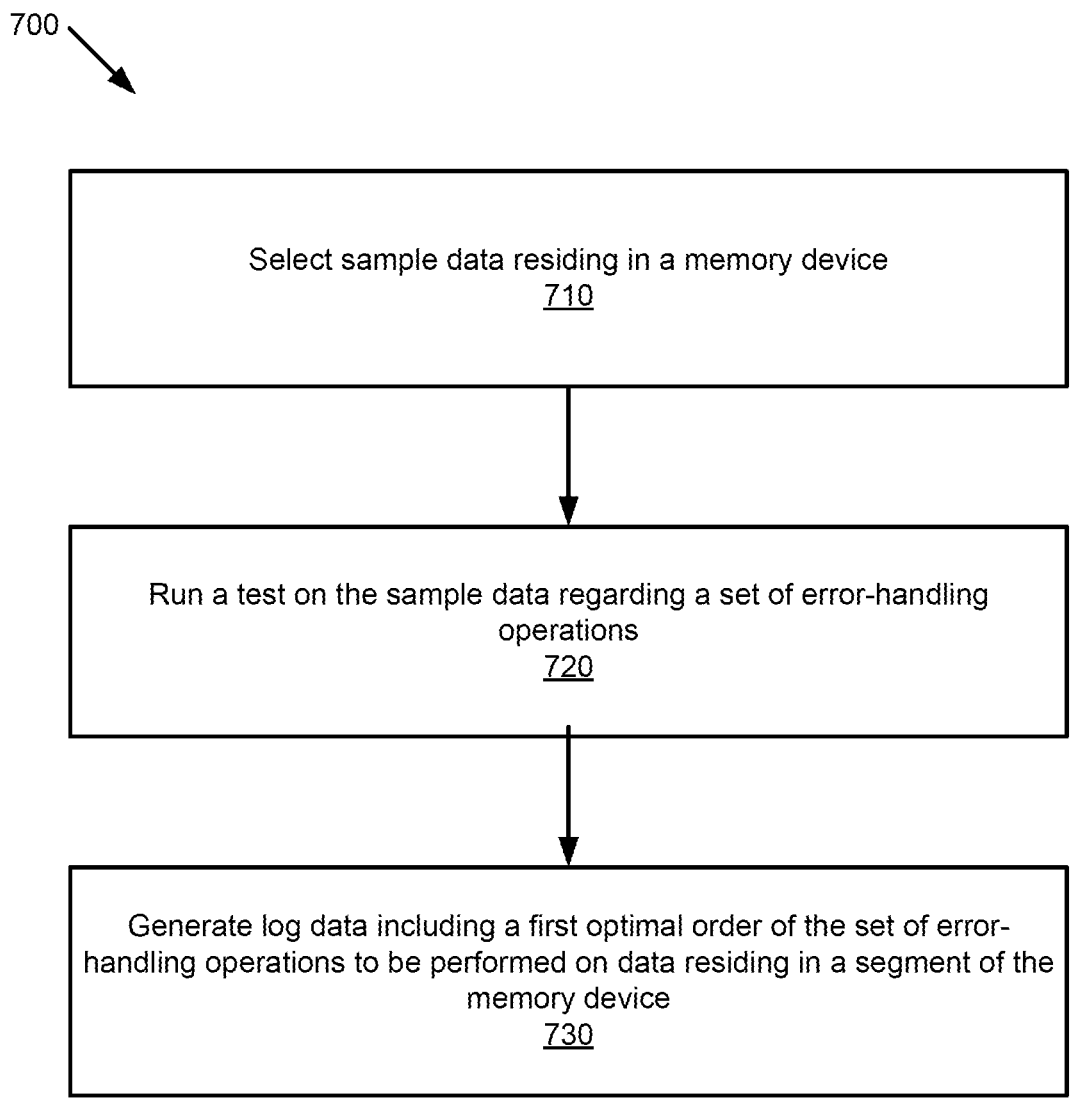

FIG. 7 is a flow diagram of an example method 700 of generating log data for error-handling flow optimization in accordance with some embodiments of the present disclosure. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the data log and optimization component 113 of FIG. 1, the data log and optimization component 113 of FIG. 2, or the data log and optimization component 113 of FIG. 3. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

At operation 710, the processing logic selects sample data residing in a memory device for collecting log data. The sample data may be randomly chosen from a segment of the memory device. The sample data may be related to a specific workload. The sample data can be applicable to a workload and a memory element described with respect to FIG. 4.

At operation 720, the processing logic runs a test on the sample data regarding a set of error-handling operations. The test may help in generating a first optimal order of the set of error-handling operations to be performed on data residing in a segment of the memory device.

At operation 730, the processing logic generates log data including a first optimal order of the set of error-handling operations to be performed on data residing in a segment of the memory device. The log data may include the first optimal order of the set of error-handling operations, e.g., selected EH operations in order as shown in FIG. 0.4. The log data may include other information that can be used for error-handling flow optimization performed in method 600.

Figure 8:
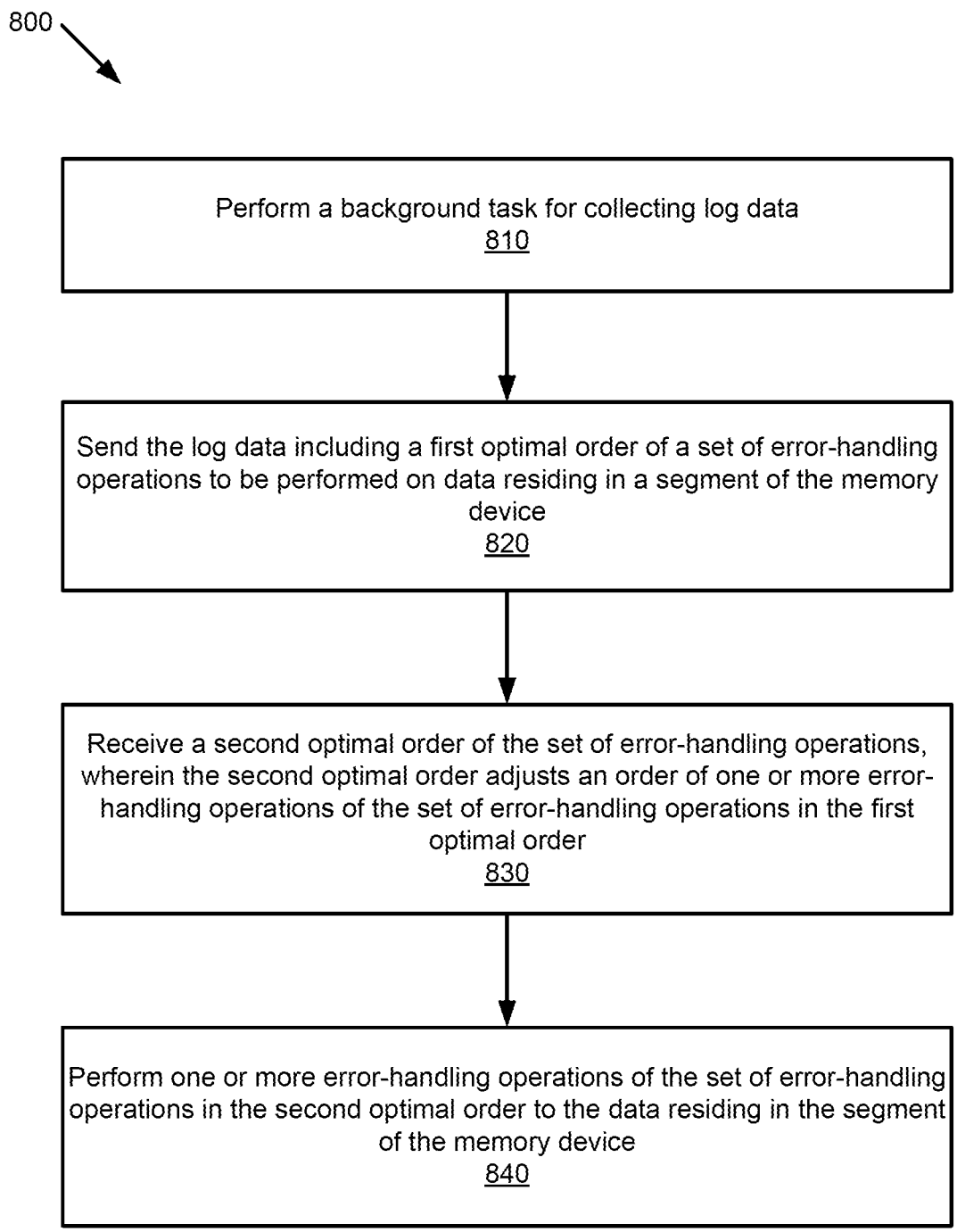

FIG. 8 is a flow diagram of an example method 800 of error-handling flow optimization in accordance with some embodiments of the present disclosure. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the data log and optimization component 113 of FIG. 1, the data log and optimization component 113 of FIG. 2, or the data log and optimization component 113 of FIG. 3. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

At operation 810, the processing logic performs a background task for collecting log data, which may be the same as or similar to the method 700 described above.

At operation 820, the processing logic sends the log data including a first optimal order of a set of error-handling operations to a device that provides error-handling flow optimization (e.g., host system 120 of FIG. 1, computing device 210 of FIG. 2, or computing device 310 of FIG. 3).

At operation 830, the processing logic receives a second optimal order of the set of error-handling operations from the device that provides error-handling flow optimization (e.g., host system 120 of FIG. 1, computing device 210 of FIG. 2, or computing device 310 of FIG. 3). The second optimal order adjusts an order of one or more error-handling operations of the set of error-handling operations in the first optimal order.

At operation 840, the processing logic performs one or more error-handling operations of the ordered set of error-handling operations in the second optimal order to the data residing in the segment of the memory device.

Figure 9:
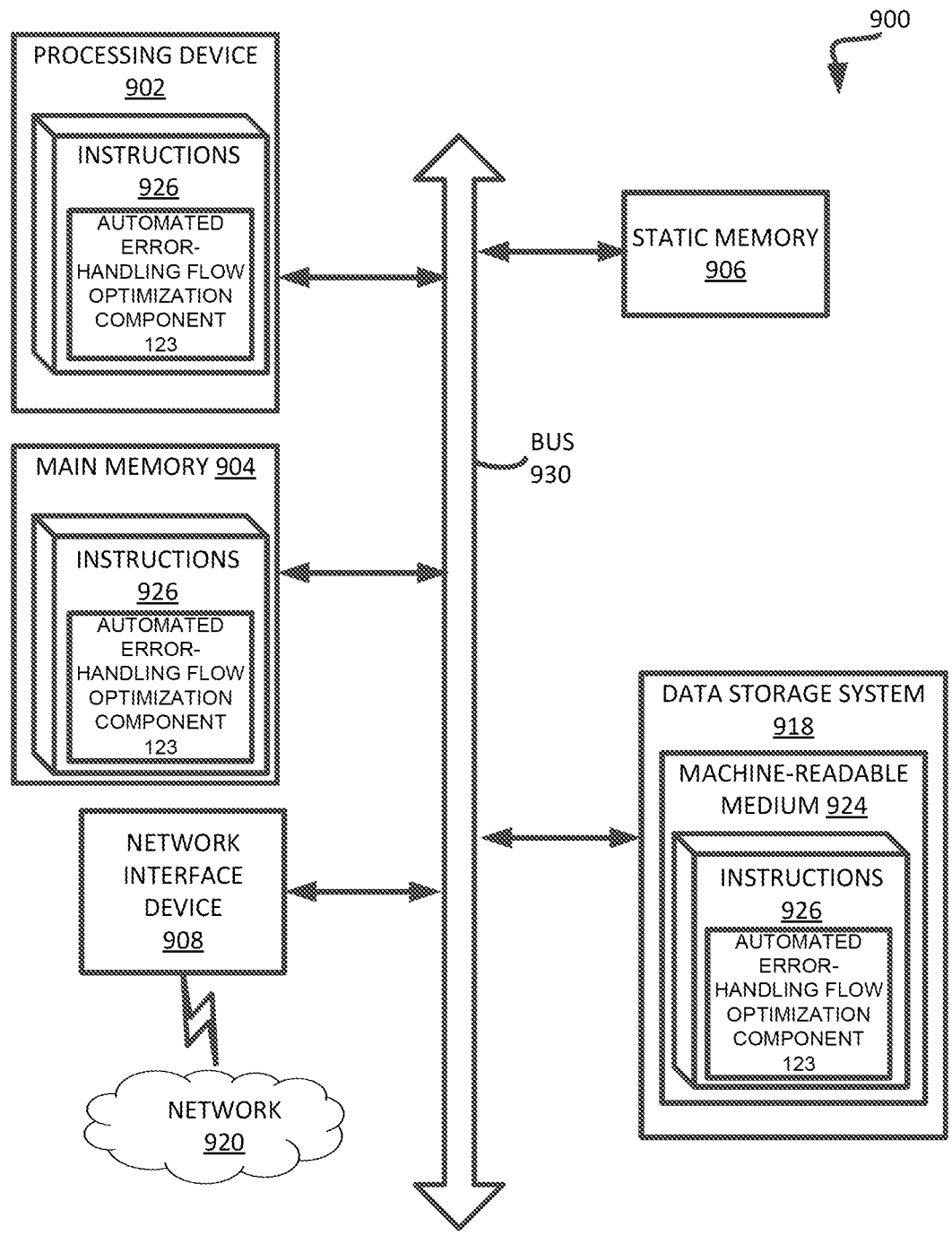
FIG. 9 is a block diagram of an example computer system in which embodiments of the present disclosure can operate.

FIG. 9 illustrates an example machine of a computer system 900 within which a set of instructions, for causing the machine to perform any one or more of the methodologies discussed herein, can be executed. In some embodiments, the computer system 900 can correspond to a host system (e.g., the host system 120 of FIG. 1) that includes or utilizes a memory sub-system (e.g., the memory sub-system 110 of FIG. 1) or can be used to perform the operations of a controller (e.g., to execute an operating system to perform operations corresponding to automated error-handling flow optimization component 123 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage system 918, which communicate with each other via a bus 930. Processing device 902 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 can also be one or more special-purpose processing devices such as an application specific integrated circuit (ASIC), a field programmable gate array (FPGA), a digital signal processor (DSP), network processor, or the like. The processing device 902 is configured to execute instructions 926 for performing the operations and steps discussed herein. The computer system 900 can further include a network interface device 908 to communicate over the network 920.

The data storage system 918 can include a machine-readable storage medium 924 (also known as a computer-readable medium) on which is stored one or more sets of instructions 926 or software embodying any one or more of the methodologies or functions described herein. The instructions 926 can also reside, completely or at least partially, within the main memory 904 and/or within the processing device 902 during execution thereof by the computer system 900, the main memory 904 and the processing device 902 also constituting machine-readable storage media. The machine-readable storage medium 924, data storage system 918, and/or main memory 904 can correspond to the memory sub-system 110 of FIG. 1.

In one embodiment, the instructions 926 include instructions to implement functionality corresponding to automated error-handling flow optimization component 123 of FIG. 1. While the machine-readable storage medium 924 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory sub-system comprising:
   a memory device; and
   a processing device, operatively coupled to the memory device, to perform operations comprising:
   selecting sample data residing in the memory device;
   running a test on the sample data regarding a set of error-handling operations; and
   generating log data comprising a first order of the set of error-handling operations to be performed on data residing in a segment of the memory device;
   sending, to a device that provides error-handling flow optimization, the log data including the first order of a set of error-handling operations;
   receiving, from the device that provides the error handling flow optimization, a second order of the set of error handling operations, wherein the second order is obtained by applying an optimization model to the log data, and wherein the optimization model is based on probability data of error recovery and latency data of the set of error-handling operations; and
   performing one or more error-handling operations of the set of error-handling operations in the second order on the data residing in the segment of the memory device.

2. The memory sub-system of claim 1, wherein generating log data is performed as a background task.

3. The memory sub-system of claim 1, wherein the log data is generated at a periodical interval.

4. The memory sub-system of claim 1, wherein the log data comprises probability data of error recovery of error recovery and latency data of the set of error-handling operations.

5. The memory sub-system of claim 1, wherein the first order is determined based on a failure or passing number of each error-handling operation in a sample set of the set of error-handling operations performed on the data residing in the segment of the memory device.

6. The memory sub-system of claim 5, wherein the first order is determined based on a highest number of the failure or passing numbers among remaining error-handling operations in the sample set, wherein the remaining error-handling operations has not yet been selected to put in an order for the first order.

7. The memory sub-system of claim 5, wherein the first order is determined based on a highest number of the failure or passing numbers among remaining error-handling operations in the sample set and latency associated with respective error-handling operations, wherein the remaining error-handling operations has not yet been selected to put in an order for the first order.

8. The memory sub-system of claim 1, wherein the second order is determined based on a cost associated with latency and probability of error recovery of each error-handling operation in the set of error-handling operations.

9. A method, comprising:
   selecting, by a processing device, sample data residing in a memory device;
   running a test on the sample data regarding a set of error-handling operations; and
   generating log data comprising a first order of the set of error-handling operations to be performed on data residing in a segment of the memory device,
   sending, to a device that provides error-handling flow optimization, the log data including the first order of a set of error-handling operations;
   receiving, from the device that provides the error-handling flow optimization, a second order of the set of error handling operations, wherein the second order is obtained by applying an optimization model to the log data, and wherein the optimization model is based on probability data of error recovery and latency data of the set of error-handling operations, and
   performing one or more error handling operations of the set of error-handling operations in the second order on the data residing in the segment of the memory device.

10. The method of claim 9, wherein generating log data is performed as a background task.

11. The method of claim 9, wherein the log data is generated at a periodical interval.

12. The method of claim 9, wherein the log data comprises probability data of error recovery of error recovery and latency data of the set of error-handling operations.

13. The method of claim 9, wherein the first order is determined based on a failure or passing number of each error-handling operation in a sample set of the set of error-handling operations performed on the data residing in the segment of the memory device.

14. The method of claim 13, wherein the first order is determined based on a highest number of the failure or passing numbers among remaining error-handling operations in the sample set, wherein the remaining error-handling operations has not yet been selected to put in an order for the first order.

15. The method of claim 13, wherein the first order is determined based on a highest number of the failure or passing numbers among remaining error-handling operations in the sample set and latency associated with respective error-handling operations, wherein the remaining error-handling operations has not yet been selected to put in an order for the first order.

16. The method of claim 9, wherein the second order is determined based on a cost associated with latency and probability of error recovery of each error-handling operation in the set of error-handling operations.

17. A non-transitory computer-readable storage medium comprising instructions that, when executed by a processing device operatively coupled to a memory device, performs operations comprising:
   selecting sample data residing in the memory device;

running a test on the sample data regarding a set of error-handling operations;
generating log data comprising a first order of the set of error-handling operations to be performed on data residing in a segment of the memory device,
sending, to a device that provides error-handling flow optimization the log data including the first order of a set of error-handling operations;
receiving, from the device that provides the error-handling flow optimization, a second order of the set of error-handling operations, wherein the second order is obtained by applying an optimization model to the log data, and wherein the optimization model is based on probability data of error recovery and latency data of the set of error handling operations; and
performing one or more error-handling operations of the set of error-handling operations in the second order on the data residing in the segment of the memory device.

* * * * *